Aug. 26, 1930.   E. J. STANLEY   1,773,886

INSTRUMENT FOR USE IN SOLVING FAULT PROBLEMS

Filed Feb. 11, 1928   3 Sheets-Sheet 1

Inventor

Ernest J. Stanley,

By Royal E. Burnham,

Attorney

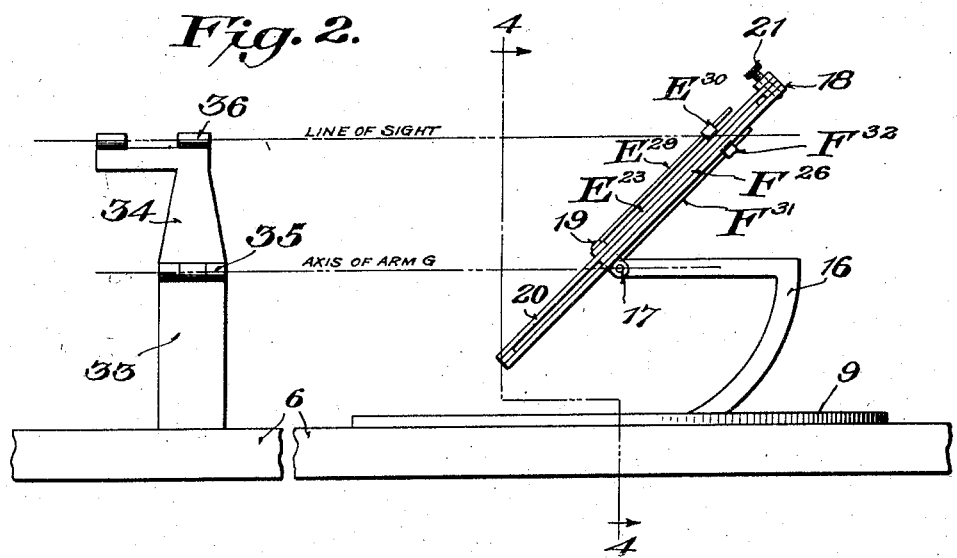
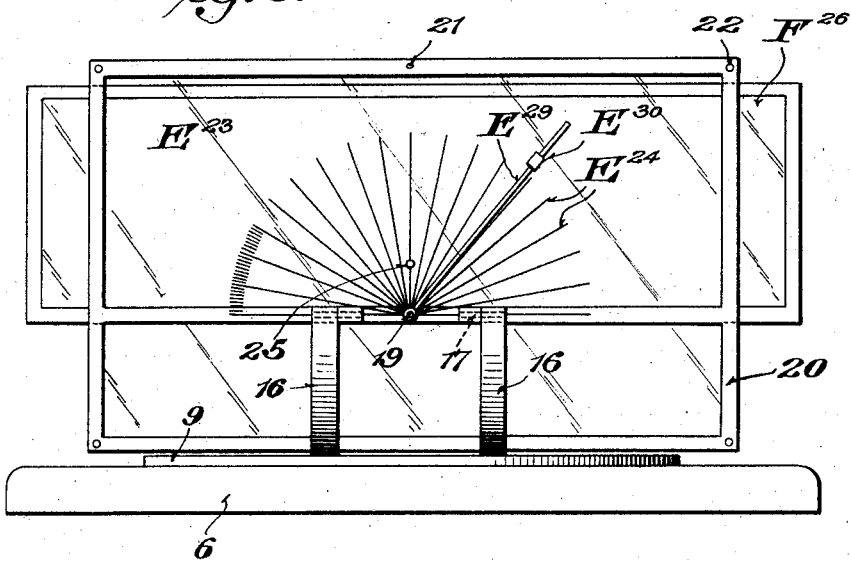

Aug. 26, 1930.  E. J. STANLEY  1,773,886
INSTRUMENT FOR USE IN SOLVING FAULT PROBLEMS
Filed Feb. 11, 1928  3 Sheets-Sheet 3
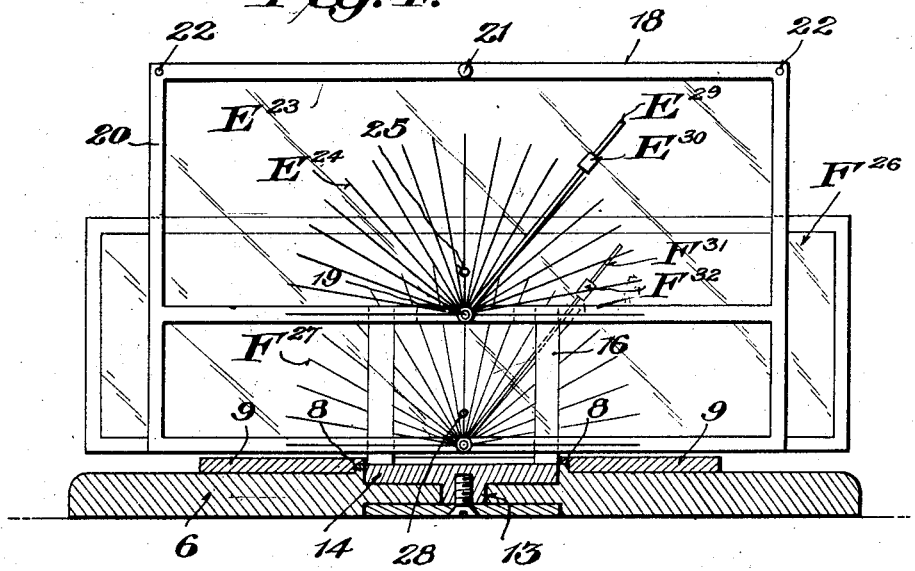
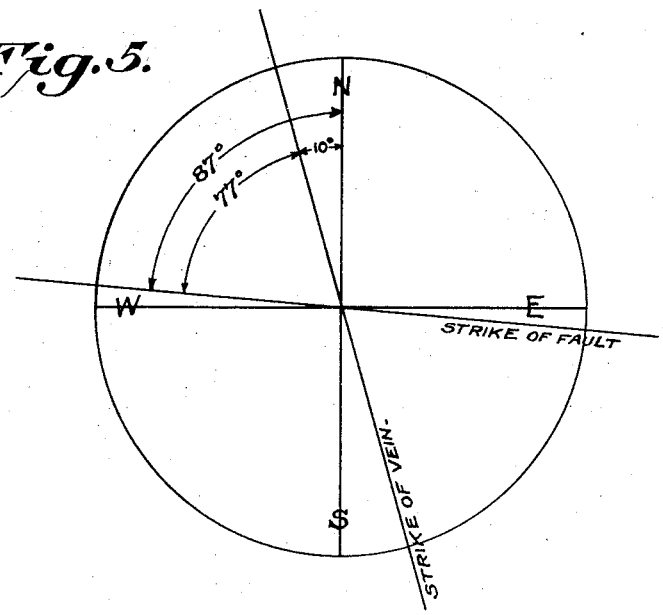
Inventor
Ernest J. Stanley,
By Royal E. Burnham,
Attorney Patented Aug. 26, 1930

1,773,886

UNITED STATES PATENT OFFICE

ERNEST J. STANLEY, OF EL TIGRE, MEXICO

INSTRUMENT FOR USE IN SOLVING FAULT PROBLEMS

Application filed February 11, 1928. Serial No. 253,632.

The instrument of this invention is for use in solving fault problems encountered in mining geology.

A geological fault is a dislocation of the rock structure of the earth, one part being thrust past the other along the line of fracture. This fracture is known as the fault-plane.

A normal fault is one where the upper part has moved downwardly relative to the rock on the lower side. A reverse fault is one in which the opposite action has occurred. Practically all faults are normal faults. Most fault-planes have an inclination or dip between the horizontal and the vertical.

In determining fault problems, the dip and strike of the vein (or bed) and the fault-plane first must be ascertained. The dip is the angle or inclination of a vein (or bed) measured from the horizontal. The strike or bearing is the direction of the line of intersection of an inclined vein (or bed) with a horizontal plane. These definitions also apply to the dip and strike of a fault-plane. The dip and strike can be ascertained most readily by the use of a Brunton compass, although they may be ascertained also with an ordinary compass and a clinometer.

If the amount of movement is known, it is possible by graphical methods to determine the position of the faulted portion of the vein. Such problems, however, could be solved heretofore only by mathematicians, and the problems were quite beyond the average mining man. Consequently, a great deal of useless work was done in searching for faulted veins, and many never were located.

By means of the instrument herein disclosed, fault problems can be solved quickly and accurately by anyone having a rudimentary knowledge of geology. The instrument, on a small scale, actually shows the relative positions of the vein and fault-plane; it affords means whereby the line of intersection between them, which is the line at which the vein is cut off by the fault, can be determined; and certain of its parts actually reproduce the faulting movement and enable the user to visualize the effect the faulting action has had on the vein.

When considered with the description herein, the characteristics of the invention are apparent in the accompanying drawings, forming part hereof, wherein an embodiment of the invention is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Fig. 2 is a side view;

Fig. 3 is a front view, part of the sight-pedestal being omitted;

Fig. 4 is a section on the line 4—4, Fig. 2;

Fig 5 is a sketch such as may be plotted in solving a problem with the instrument.

Figure 1:
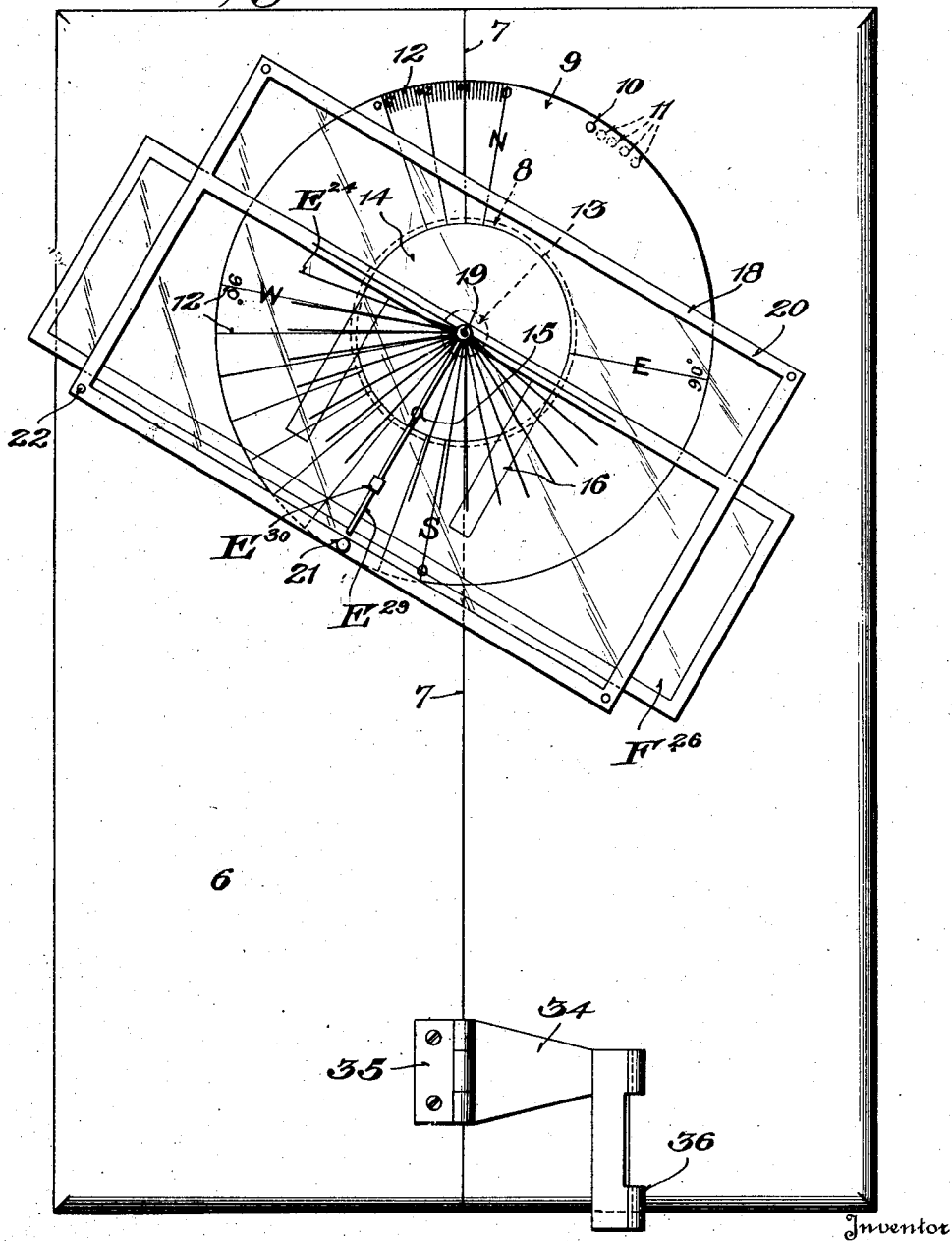
Fig. 1 is a plan view.

The instrument includes a flat base 6, having an upper plane surface, which is horizontal when the instrument is in use. The surface of the base is marked with a longitudinal axial line 7. The base has thereon an upstanding annular flange 8 centered in the line 7.

A circular plate 9 lies on the base, and snugly fits, and is rotatable on, the flange 8. Frictional contact of the plate with the flange may be relied upon to hold the plate in adjusted position, or it may be held by a pin 10 protrudable therethrough into any of holes 11 in the base. The plate has thereon a graduated circle provided with degree-spaced or graduated lines 12 radiating from the center of the flange, and marked as shown to designate degrees of a circle from 0 normally at the longitudinal axis 7 to 90 on each side thereof.

A pedestal member 13 is mounted on the base to turn on an axis perpendicular thereto and concentric with the flange 8 and the graduated plate 9. The pedestal 13 includes an upper circular plate 14 within the flange, marked at its edge with a zero point 15 that may be brought into alignment with the graduated lines of the plate 9. Arms 16, fixed to, or formed integrally with, the plate 14, extend upwardly therefrom.

By means of a hinge 17, a frame 18 is mounted on the arms 16 to swing on a horizontal axis that intersects the vertical axis of rotation of the pedestal at 19. The parts so are coordinated that, when the zero point 15 of the pedestal registers with the axial line 7 of the base, the plane of the frame and the horizontal axis of its movement are at right angles to that line. The frame is formed of opposed members 20, one of which carries a screw 21 projecting therethrough.

By suitable fastenings 22, a flat sheet E—23, of celluloid or other suitable transparent material, is fixed in the frame. The sheet E—23 has on its surface a graduated segment of a circle afforded by degree-spaced or graduated lines E—24. which radiate from a common center at the intersection of the axes of movement of the pedestal and frame at 19. The center or zero line is designated by a "0" at the place marked 25 in the lower part of the sheet.

A flat sheet F—26, of celluloid or other suitable transparent material, substantially parallel with the sheet E—23, is slidable in the frame between the members thereof, and it is held in adjusted position by the screw 21. The sheet F—26 has thereon a graduated segment of a circle afforded by degree-spaced or graduated lines F—27 corresponding in relative disposition to those of sheet E—23, and its center or zero line is designated by a "0" at the place marked 28 in the lower part of the sheet.

If desired, a pointer-arm E—29 may be mounted to swing on sheet E—23 at point 19, which is at the intersection of the axes of movement of the pedestal and frame and at the center of the graduated circle of that sheet. A button or marker E—30 is slidable longitudinally on arm E—29. A similar pointer-arm F—31 is mounted pivotally on sheet F—26 at the center of its graduated circle, and it has a button or marker F—32 slidable longitudinally thereon. The arms E—29 and F—31 are mounted snugly on their pivots, and the markers E—30 and F—32 snugly on those arms, so that the arms and markers will remain at the places to which they are set.

A fixed pedestal 33 on the base, at a place distant from the pedestal 13, has mounted thereon an arm 34, which is swingable at 35 on an axis that is parallel with the axial line 7 of the base and that if extended would intersect with the point 19 at the intersection of the axes of movement of the pedestal 13 and the frame. The arm 34 carries sights 36 so positioned that the line of sight therethrough is parallel with the plane of the vein and coplanar with the axis at 35.

In using the instrument, sheet F—26, which represents the upper or hanging-wall side of a fault that has slipped down on the under or footwall side of the fault-plane represented by the sheet E—23, is placed on sheet E—23 in such manner that any fault movement, in a plane surface, can be reproduced, and the actual effect a fault movement has had on a vein can be determined by mechanical means; and the intersection of the vein with the fault-plane, by prolongation of the line of sights 36 to the fault-plane, can be determined.

The dip of the vein or bed (its angle of inclination measured from the horizontal) and the strike (the direction of the line of intersection of an inclined vein or bed with a horizontal plane) having been ascertained, data is available for solving a particular fault problem by use of the instrument.

It is assumed that the fixed sheet E—23 represents the under or footwall side of the fault-plane; that the movable sheet F—26 represents the upper or hanging-wall side, which has slipped down on the under side; and that the arm 34 lies in the plane of the vein.

The strike of the vein and the strike of the fault having been ascertained, the horizontal angle between them can be calculated. The strike of the vein being taken as 0 degrees, the frame 18 is set in such position that the horizontal angle shown by the graduated circle on the plate 9 is the same as that calculated between the strikes of the vein and the fault. The vertical angle of the frame 18 then is set, by means of a protractor, at the dip or vertical angle of the fault-plane. The arm 34 is set, by means of a protractor, at the dip or vertical angle of the vein. Sheet F—26 is placed in such position with respect to sheet E—23 that their "0" points 25 and 28 and their graduated lines 24 and 27 coincide. This position represents the original position before faulting occurred.

The line of intersection of the fault-plane and the vein now can be determined by looking through the sights 36 and finding the points where sheets E—23 and F—26 are intersected by the line of sight. When the pointer-arms E—29 and F—31 are not present on the instrument, the sighted intersecting points may be designated by marks made with pen or pencil on the respective sheets; and lines are drawn on the respective sheets from those marks toward the point 19 to represent the line of intersection of the vein and fault-plane. The radial lines are provided on the sheets to assist in drawing the lines E—2 and F—2. When pointer-arms E—29 and F—31 are used, those arms and the markers E—30 and F—32 are moved to the sighted place of intersection; and, when the instrument is equipped with those arms and markers, the radial lines on the sheets may be omitted, if desired.

The sheet F—26 now is slid down on sheet E—23, this movement representing the earth movement during the faulting period. As the movement occurs, the point F—1 and the radial line F—2 or the marker F—32 and the arm F—31, as the case may be, change position with respect to point E—1 and radial line E—2 or with respect to the marker E—30 and the arm E—29. The final position taken is the position of the faulted portion of the vein after the fault movement ceased. Point F—1 (or marker F—32) is the new position of a certain part of the vein that formerly was joined at the place represented by the point E—1 or marker E—30.

If the amount of fault movement were known, the distance between the "E" and "F" points could be calculated easily. The direction the "F" line had assumed with respect to the "E" line is the direction a crosscut would have to be driven to encounter the faulted portion of the vein. If it were desired to cut the vein at the new position of the "F" point, the direction and distance that would have to be driven from the "E" point could be ascertained readily. For example, the "E" point might be a drift in a rich section of the vein; and, if the vein were cut off by a fault, it would be desirable to get on the faulted portion of the vein at this rich section, which would be at the "F" point.

In order that the manner of use of the instrument may be understood thoroughly, solution of problems therewith is given by way of example, as follows, it being understood that, when the points E—1 and F—1 and the lines E—2 and F—2 are mentioned, they also may be taken to indicate the markers E—30 and F—32 and the arms E—29 and F—31, respectively:

*Example I*

The vein or bed has a strike of N. 10 deg. W., and it dips 60 deg. SW.; and the fault-plane has a strike of N. 87 deg. W., and it dips 45 deg. NE. It first is necessary to determine the horizontal angle between the strike of the vein and the strike of the fault-plane. When circular plate 9 is not on the instrument, this can be done by making a sketch, such as shown by Fig. 5 of the drawing, showing four quadrants, and on it laying off the bearings of the strikes of the vein and fault-plane. The angle between them can be calculated.

In using the instrument, the strike of the vein is assumed to coincide with the axis of the arm 34 at zero degrees of the graduated scale of the base, which then is fixed with its zero point in the axial line of the base. The angle between the vein and the fault-plane being 77 deg., the frame 18 carrying the sheets representing the fault-plane is swung on its vertical axis until it coincides with 77 deg. on the graduated circle of the base. The dip of the fault-plane then is set by swinging frame 18 on its horizontal axis to an angle of 45 deg., the dip being to the northeast, the setting of this angle being done by a semi-circular protractor graduated to degrees. Movable sheet F—26, which represents the rock structure on the upper side of the fault-plane, is placed uppermost. The arm 34 is set to the angle of the dip of the vein at 60 deg. by use of a degree-graduated protractor. Sheet F—26 is placed on sheet E—23 in such position that the zero points and radial lines of the two sheets coincide. The instrument then shows the relative positions of the vein and fault-plane before faulting occurred and the vein became dislocated. By sighting through the sights 36, points E—1 and F—1 are located on sheets E—23 and F—26, respectively. Lines E—2 and F—2 are drawn from these points toward the point 19 to represent the line of intersection of the vein and the fault-plane.

In the problem under consideration, the fault is normal, and the direction of faulting is parallel with the dip of the fault. To represent this fault movement, the screw holding sheet F—26 is loosened and the sheet is slid downwardly on sheet E—23. This represents the movement of the upper side of the rock structure relative to the lower side. Line F—2, which originally coincided with the line E—2, has moved to a new position to the right of line E—2, and this is the final position of the faulted portion of the vein that originally had been adjacent to line E—2. It readily can be seen that, if a drift had been driven along the vein to the line E—2 and the vein then lost through faulting, it would be necessary to turn to the right to find the faulted portion of the vein. The direction of drive from point E—1 to get to the final position of point F—1 also could be determined. This often would be necessary to find certain rich portions of the vein that has been cut off by a fault.

The total displacement of a fault often is known; and, if known, the distance that would have to be driven horizontally along the fault-plane to find the vein could be determined as follows: The distance between the zero point on sheet E—23 and the final position of the zero point on sheet F—26 is to the horizontal distance along sheet E—23 between line E—2 and the final position of line F—2 as the total displacement of the fault is to the distance that must be driven to encounter the vein. The shortest horizontal distance that could be driven to cut the faulted portion of the vein would be the horizontal distance between line E—2 and the final position of line F—2 multiplied by the sine of the horizontal angle between the strike of the vein and the strike of the fault-plane.

*Example II*

It is assumed that the data is the same as that set forth in Example I, but a turnable graduated circle on the base, such as shown, is used, and the necessity of making a diagram, such as required in that example, is avoided.

The strike of the vein being N. 10 deg. W., the graduated circle 9 is turned until the point of that degree on the circle coincides with the strike of the vein on the opposite side of the base from the arm 34. This would be a prolongation of the arm 34 to the far side of the base. The strike of the fault-plane being N. 87 deg. W., frame 18 would be turned on its vertical axis until it coincides with the point N. 87 deg. W. on the graduated circle. The dip of the vein and of the fault-plane would be set as explained in Example I. By use of the movable circle, the fault plane can be set in its proper position without any calculation whatever. The results obtained by the two methods would be exactly the same.

What I claim as new, and desire to secure by Letters Patent, is—

1. In an instrument for use in solving fault problems, two adjacent substantially parallel flat members, one slidable in its plane with respect to the other, said members being marked to show the relative positions of parts in an earth fault, and means determining a line of sight intersecting said members.

2. In an instrument for use in solving fault problems, two adjacent substantially parallel flat members, one slidable in its plane with respect to the other, said members being marked to show the relative position of parts in an earth fault, and a sight adjustable to the vertical angle of a vein whereby the line at which the vein is cut off by the fault may be determined.

3. In an instrument for use in solving fault problems, two adjacent substantially parallel flat members, one slidable in its plane with respect to the other, said members being marked to show the relative position of parts in an earth fault, and means for mounting said members for movement on substantially horizontal and vertical axes whereby they are adjustable to the horizontal angle between the strike of a vein and the fault plane and to the vertical angle of the fault plane.

4. In an instrument for use in solving fault problems, two adjacent substantially parallel flat members, one slidable in its plane with respect to the other, said members being marked to show the relative positions of parts in an earth fault, means for mounting said members for movement on substantially horizontal and vertical axes whereby they are adjustable to the horizontal angle between the strike of a vein and the fault plane and to the vertical angle of the fault plane, and a sight adjustable to the vertical angle of the vein whereby the line at which the vein is cut off by the fault may be determined.

5. In an instrument for use in solving fault problems, two substantially parallel adjacent sheets, and means mounting said sheets to swing on axes substantially perpendicular to each other, one of said sheets being slidably adjustable in its plane with respect to the other to represent the relative movement of earth structure during formation of a fault.

6. In an instrument for use in solving fault problems, two substantially parallel adjacent sheets, means mounting said sheets to swing on axes substantially perpendicular to each other, one of said sheets being slidably adjustable in its plane with respect to the other to represent the relative movement of earth structure during formation of a fault, and a sight adjustable to the vertical angle of a vein whereby the line at which the vein is cut off by the fault may be determined.

7. An instrument for use in solving fault problems comprising a base, a frame mounted thereon swingable on axes substantially perpendicular to each other, substantially parallel sheets on said frame, usable to represent portions of an earth fault, and one slidably adjustable with respect to the other, means whereby the angle to which said frame is turned on one of its axes is indicated, an arm on said base swingable on an axis intersecting one of the axes of said frame, and a sight on said arm through which points on said sheets can be observed and determining a line of sight coplanar with the axis of said arm.

8. An instrument for use in solving fault problems comprising a frame swingable on axes substantially perpendicular to each other, a sheet fixed on said frame usable to represent one side of an earth fault, a sheet substantially parallel with and slidable with respect to said fixed sheet to represent displaced structure of the fault, means whereby the angle to which said frame is turned on one of its axes is indicated, an arm swingable on an axis intersecting one of the axes of said frame, and a sight on said arm through which points on said sheets can be observed.

9. An instrument for use in solving fault problems comprising a base member, a pedestal member turnable on said base on a substantially vertical axis, a frame swingable on said pedestal member on a substantially horizontal axis, substantially parallel sheets on said frame usable to represent portions of an earth fault and one slidably adjustable with respect to the other, there being marks on one of said members to indicate the angle to which said frame is turned on the vertical axis, an arm swingable on an axis intersecting one of said before-mentioned axes, and a sight on said arm through which points on said sheets can be observed and determining a line of sight coplanar with the axes of said arm.

10. An instrument for use in solving fault problems comprising a frame swingable on axes substantially perpendicular to each other, substantially parallel sheets on said frame usable to represent portions of an earth fault and one slidably adjustable with respect to the other, means whereby the angle to which said frame is turned on one of its axes is indicated, an arm swingable on an axis intersecting the point of intersection of the frame axes, and a sight on said arm through which points on said sheets can be observed and determining a line of sight coplanar with the axis of said arm.

11. An instrument for use in solving fault problems comprising a frame swingable on axes substantially perpendicular to each other, substantially parallel sheets on said frame usable to represent portions of an earth fault, one slidably adjustable with respect to the other, and one having a mark at the intersection of said axes, means whereby the angle to which said frame is turned on one of its axes is indicated, an arm swingable on an axis intersecting said mark, and a sight on said arm through which points on said sheets can be observed and determining a line of sight coplanar with the axis of said arm.

12. An instrument for use in solving fault problems comprising a frame swingable on axes substantially perpendicular to each other, a sheet fixed to said frame usable to represent one side of an earth fault and having thereon a mark at the intersection of said axes, another sheet on said frame substantially parallel with and slidable with respect to said fixed sheet usable to represent displaced structure of a fault and having thereon a mark for registry with said mark on said fixed sheet, means whereby the angle to which said frame is turned on one of its axes is indicated, an arm swingable on an axis intersecting said mark on said fixed sheet, and a sight on said arm through which points on said sheets can be observed and determining a line of sight coplanar with the axis of said arm.

13. An instrument for use in solving fault problems comprising a frame swingable on axes substantially perpendicular to each other, substantially parallel sheets on said frame usable to represent portions of an earth fault and one slidably adjustable with respect to the other, a pivoted pointer-arm swingable over one of said sheets, means whereby the angle to which said frame is turned on one of its axes is indicated, a sight-arm swingable on an axis intersecting one of the axes of said frame, and a sight on said sight-arm through which points on said sheets can be observed and determining a line of sight coplanar with the axis of said sight-arm.

14. An instrument for use in solving fault problems comprising a frame swingable on axes substantially perpendicular to each other, a sheet fixed on said frame usable to represent one side of an earth fault, a pointer-arm pivoted at the intersection of said axes swingable over said sheet, another sheet substantially parallel with and slidable with respect to said fixed sheet usable to represent displaced structure of the fault, means whereby the angle to which said frame is turned on one of its axes is indicated, a sight-arm swingable on an axis intersecting one of the axes of said frame, and a sight on said sight-arm through which points on said sheets can be observed and determining a line of sight coplanar with the axis of said sight-arm.

15. An instrument for use in solving fault problems comprising a frame swingable on axes substantially perpendicular to each other, a sheet fixed on said frame usable to represent one side of an earth fault, another sheet substantially parallel with and slidable with respect to said fixed sheet usable to represent displaced structure of the fault, a pivoted pointer-arm swingable over said slidable sheet, means whereby the angle to which said frame is turned on one of its axes is indicated, a sight-arm swingable on an axis intersecting one of the axes of said frame, and a sight on said sight-arm through which points on said sheets can be observed and determining a line of sight coplanar with the axis of said sight-arm.

16. An instrument for use in solving fault problems comprising a frame swingable on axes substantially perpendicular to each other, a sheet fixed on said frame usable to represent one side of an earth fault, a pointer-arm pivoted at the intersection of said axes swingable over said sheet, another sheet substantially parallel with and slidable with respect to said fixed sheet usable to represent displaced structure of the fault, a pivoted pointer-arm swingable over said slidable sheet, means whereby the angle to which said frame is turned on one of its axes is indicated, a sight-arm swingable on an axis intersecting one of the axes of said frame, and a sight on said sight-arm through which points on said sheets can be observed and determining a line of sight coplanar with the axis of said sight-arm.

17. An instrument for use in solving fault problems comprising a frame swingable on axes substantially perpendicular to each other, substantially parallel sheets on said frame usable to represent portions of an earth fault and one slidably adjustable with respect to the other, a pivoted pointer-arm swingable over one of said sheets, a point-marker slidable on said arm, means whereby the angle to which said frame is turned on one of its axes is indicated, a sight-arm swingable on an axis intersecting one of the axes of said frame, and a sight on said sight-arm through which points on said sheets can be observed and determining a line of sight coplanar with the axis of said sight-arm.

18. An instrument for use in solving fault problems comprising a base, a pedestal turnable on said base on a substantially vertical axis, a degree-marked member turnable on the axis of said pedestal, a frame on said pedestal swingable on a substantially horizontal axis, substantially parallel sheets on said frame usable to represent portions of an earth fault and one slidably adjustable with respect to the other, an arm mounted on said base swingable on an axis intersecting that of said pedestal, and a sight on said arm through which points on said sheets can be observed and determining a line of sight coplanar with the axis of said arm.

19. An instrument for use in solving fault problems comprising a base, a pedestal turnable on said base on a substantially vertical axis, a degree-marked member turnable on the axis of said pedestal, means whereby said member is fixed with respect to said base, a frame on said pedestal swingable on a substantially horizontal axis, substantially parallel sheets on said frame usable to represent portions of an earth fault and one slidably adjustable with respect to the other, an arm mounted on said base swingable on an axis intersecting that of said pedestal, and a sight on said arm through which points on said sheets can be observed and determining a line of sight coplanar with the axis of said arm.

In testimony whereof I affix my signature.

ERNEST J. STANLEY.